United States Patent [19]
Yard

[11] 3,709,213
[45] Jan. 9, 1973

[54] FLUID-POWERED FLOWMETER FOR MEASURING LOW FLOW RATES

[75] Inventor: John S. Yard, Warminster, Pa.
[73] Assignee: Fischer & Porter Co., Warminster, Pa.
[22] Filed: Sept. 16, 1970
[21] Appl. No.: 72,747

[52] U.S. Cl. .............................. 128/2.08, 73/194 R
[51] Int. Cl. ................................................ A61b 5/08
[58] Field of Search ..... 128/2.08, 2.07, 2 C, 2 F, 2 R, 128/2.08; 73/194 R, 205; 137/81.5

[56] References Cited

UNITED STATES PATENTS

| | | | |
|---|---|---|---|
| 3,098,383 | 7/1963 | West | 128/2.08 X |
| 3,343,413 | 9/1967 | South et al. | 73/194 R |
| 3,429,323 | 2/1969 | Mott | 73/194 R |
| 2,933,082 | 4/1960 | Billin | 128/2.07 |
| 3,403,678 | 10/1968 | Bolie | 128/2.07 |
| 3,511,237 | 5/1970 | Jaeger | 128/2.08 |
| 3,208,463 | 9/1965 | Hurvitz | 137/81.5 |

FOREIGN PATENTS OR APPLICATIONS

| | | | |
|---|---|---|---|
| 881,444 | 11/1961 | Great Britain | 128/2.08 |
| 1,240,273 | 7/1960 | France | 128/2.08 |

OTHER PUBLICATIONS

The Lancet, October 22, 1960, pg. 908

*Primary Examiner*—Kyle L. Howell
*Attorney*—Michael Ebert

[57] ABSTRACT

A fluid-powered flowmeter for measuring the flow rate of human breath or other relatively low levels of flow. The meter includes an open-ended flow tube for receiving the subject stream, the tube being provided with an inlet port for injecting therein a fluid from a regulated power source to produce a radial air pattern in the tube. Mounted on the outer circumference of the tube is a collector port adapted to capture the diverging jet stream, the collector being coupled to a flow transducer for converting the jet flow rate into corresponding electrical values. When the subject stream is blown into the tube, the radial air pattern is deflected away from the collector to an extent depending on the flow rate of the subject stream, thereby producing a proportional change in the electrical output which may be indicated or recorded, or fed into a computer for comparison with established norms.

4 Claims, 7 Drawing Figures

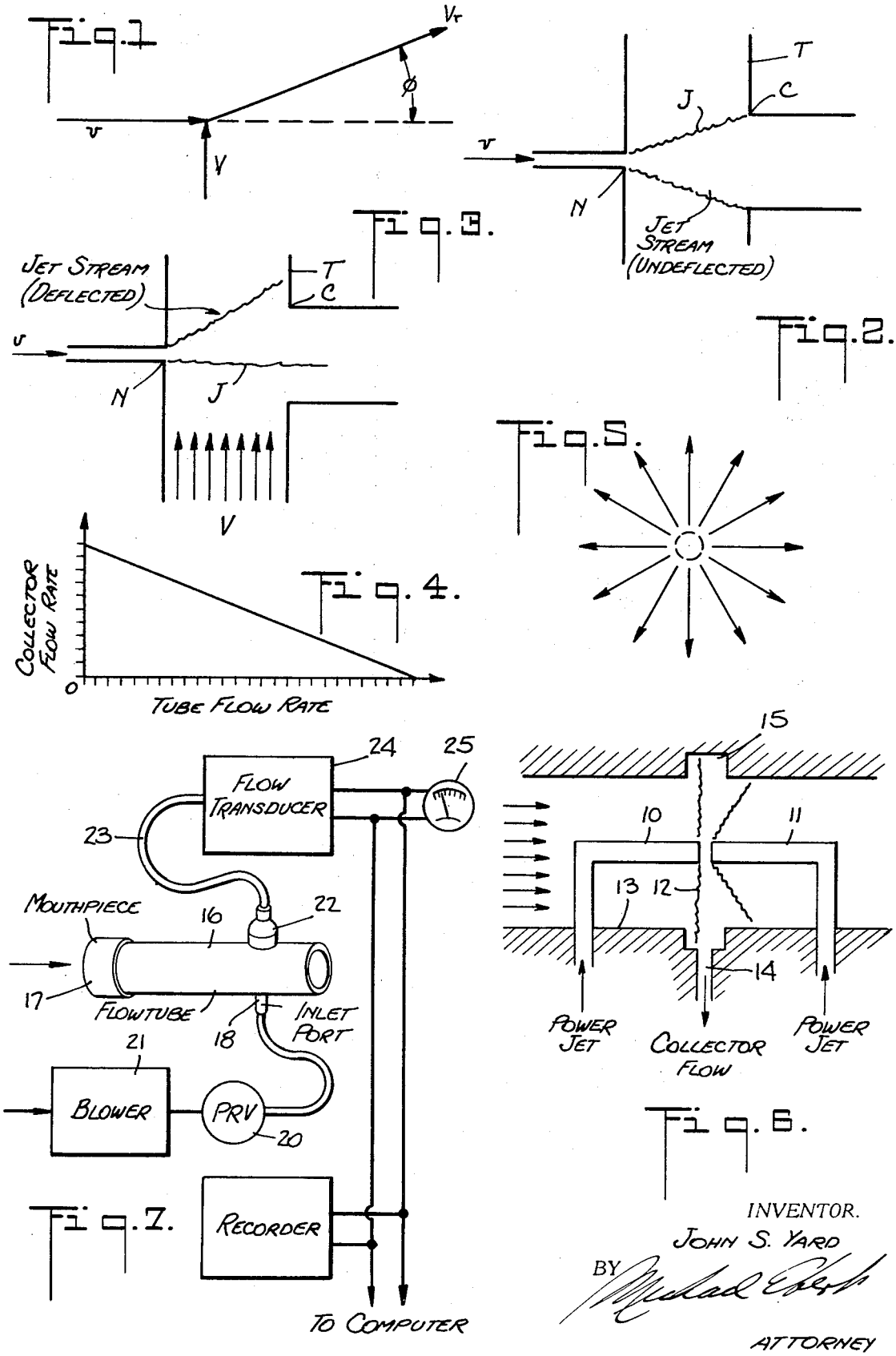

FLUID-POWERED FLOWMETER FOR MEASURING LOW FLOW RATES

BACKGROUND OF THE INVENTION

This invention relates generally to meters for measuring fluid flow, and more particularly to a flowmeter adapted to measure the rate and volume of human breath and other exceptionally low flow rates which are difficult to measure with standard meters.

Breathing is a process in which air is drawn into the lungs (inspiration) and then forced therefrom (expiration). In highly industrialized societies, the ability of a person to breathe is adversely affected not only by atmospheric pollution but also by smoking habits and other deleterious factors leading to respiratory ailments, such as emphysema. Emphysema is a local or generalized condition of the lungs, marked by distension and the progressive loss of elasticity, accompanied by labored breathing.

In diagnosing the ability of a patient's lungs to function, the simplest and most reliable test is to measure the patient's blowing capacity, for this is indicative of the condition of his lungs. For example, a typical male patient with healthy lungs, when blowing through a tube having an orifice whose diameter is 1 inch, is able to attain a maximum flow rate of about 5 liters per second. But with patients whose lungs are impaired, the maximum rate attained in blowing may be much lower than this value.

The difficulty with conducting flow-rate tests in connection with the ability of a patient to blow is that existing flowmeters do not work effectively at the relatively low flow rate encountered in this context. The reason for this is that flowmeters require power to carry out their measurements, and the power supplied by a blowing action is insufficient to operate existing meters.

In the simpler forms of available flowmeters, the operating power therefor is derived directly from the medium being tested, resulting in a permanent pressure loss. In meters of greater sophistication, power taken from the fluid is usually supplemented by external power. Devices which operate on external power generally make use of electrical energy converted into magnetic flux, mechanical motion or heat. Such devices are often limited in applicability or are of complex and expensive construction.

The need exists, therefore, for a simple, low-cost flowmeter capable of accurately measuring exceptionally low rates, such as that produced by a human blowing action.

SUMMARY OF THE INVENTION

In view of the foregoing, it is the main object of this invention to provide a flowmeter capable of measuring low flow rates, such as that produced by breathing, the meter making use of fluidic power derived from an external source.

More particularly, it is an object of the invention to provide a flowmeter of the above type, adapted to convert the reading of flow rate into corresponding electrical values whereby the breathing rate and lung capacity of a patient may be quickly analyzed and compared by computer techniques with established norms to determine the lung condition of the patient.

Also an object of the invention is to provide a flowmeter of the above type which is efficient and reliable in operation, and which may be manufactured at low cost.

Briefly stated, these objects are attained in a flowmeter, one preferred embodiment of which includes an open-ended flow tube having a mouthpiece through which a patient to be tested is able to blow. Attached to one side of the tube is an inlet nozzle coupled to an external pressure-regulated fluidic power source, thereby producing across the tube a diverging jet stream which is intercepted by a collector port whose diameter is sufficient to capture all of the jet flow. The collector port is coupled to a flow transducer adapted to convert the jet flow rate into corresponding electrical values.

When the patient blows into the flow tube, the jet stream is deflected away from the collector port to an extent depending on the flow rate of the subject stream, thereby producing a porportional change in the electrical output which may be indicated or recorded, or fed into a computer for comparison with established norms.

OUTLINE OF THE DRAWING

For a better understanding of the invention, as well as other objects and further features thereof, reference is made to the following detailed description to be read in conjunction with the accompanying drawings, in which:

FIG. 1 is a vector diagram illustrative of the principles underlying the invention;

FIG. 2 is a flow tube having a fluidic jet introduced therein, the jet being undeflected;

FIG. 3 shows the same flow tube, but with the jet deflected by a subject stream;

FIG. 4 is a graph showing the relationship between flow rate in the flow tube and collector flow rate;

FIG. 5 illustrates the pattern of a radial jet stream;

FIG. 6 is an embodiment of the invention in which a radial jet stream is produced; and FIG. 7 schematically shows a meter in accordance with the invention, to measure the flow rate of fluid blown from the lungs of a patient being tested.

DESCRIPTION OF THE INVENTION

A flowmeter in accordance with the invention overcomes the drawbacks characteristic of prior-art devices by converting an external, regulated fluid source into fluidic power in the form of a fluidic jet which then interacts with the subject or main flow stream, and is thereby modified or deflected as a function of the flow rate of the subject stream.

To illustrate this principle, let us consider a small fluidic jet having a velocity vector $v$, directed at right angles to a subject stream whose velocity vector is $V$, as shown in FIG. 1. If there is a constant exchange of momentum between the two flows and the fluidic jet remains constant in velocity, the resultant vector $v_r$ will be directed at an angle $\phi$ dependent upon $V$.

This principle is applicable to flow in a flow tube $T$, as shown in FIG. 2, by directing a small fluidic jet $J$ across the tube, the fluidic power being introduced by a supply port $N$ on one side of the tube. Jet $J$ will diverge as it traverses the tube, so that the collector port $C$, disposed on the opposite side of the tube, must be wider than the supply port in order to capture all of the jet flow. FIG. 2 shows the condition which prevails when there is no axial flow in the tube.

With axial flow in the tube from a subject fluid stream V, as shown in FIG. 3, power jet J is deflected downstream as a function of flow velocity. Consequently, a portion of the jet flow avoids the collector opening, so that the collector flow rate becomes an inverse function of the subject flow rate, as indicated by the graph in FIG. 4. The collected jet flow may be measured by conventional flowmeter means, for now sufficient fluidic power is available to accommodate whatever measuring device is selected.

In another embodiment of the flowmeter arrangement, the jet may be introduced into flow tube T so as to create a relatively uniform radial field whose pattern is shown in FIG. 5, to improve the interaction with the subject main stream in that the entire main stream is intercepted. This may be accomplished, as shown in FIG. 6, by introducing the power jet through a pair of oppositely directed nozzles 10 and 11 which are axially positioned within tube 13 whereby the resultant jets impinge against each other to create an axial jet flow 12 which is received by a collector port 14 coupled to an annular channel 15 whose width is sufficient to capture the radial jet stream.

Referring now to FIG. 7, a flowmeter is shown which is adapted to measure the rate and volume of fluid blown into a flow tube 16 by a patient whose lung power is being diagnosed. Flow tube 16 is provided with a removable mouthpiece 17 which may be made of sterile plastic material and dispensed with after each test. The diameter of the tube is such as to be easily accommodated by the mouth of the subject under test.

A jet inlet port 18 formed on the side of flow tube 16 is coupled by a flexible pipe 19 to a pressure-regulated valve 20 in the output of an external fluidic power source 21 which in practice may be a simple blower or a tank of compressed air, so that the inlet fluid enters the tube at a constant rate and is collected by the collector port 22 on the diametrically opposed side of tube 16.

Collector 22 is coupled by flexible pipe 23 to a flow transducer adapted to convert flow rate into corresponding electrical values. This may take the form of any existing electrical-type flowmeter, such as the target or drag type, wherein the fluid to be measured effects a change in the value of a resistance or strain gauge.

The voltage produced by transducer 24 is applied to a voltmeter 25 which may be calibrated in terms of flow rate, or it may be applied to a moving pen or any other suitable type of recorder 26. By integration of flow rate, one may obtain the volume of fluid a patient is capable of blowing out of his lungs and thereby determine the capacity as well as the strength of the lungs in question. Or the output voltage may be applied to a suitable electronic minicomputer, programmed to compare the measured flow rate values with reference values providing lung behavior norms for male and female subjects at different age levels. In this way, the computer read-out will provide the tester with information as to the status of the lungs of the patient.

While there have been shown and described preferred embodiments of the fluid-powered flowmeter in accordance with the invention, it will be understood that many changes and modifications may be made therein without, however, departing from the essential spirit thereof.

I claim:

1. A meter for measuring the flow rate of human breath or other relatively low levels of fluid flow, said meter comprising:
    a. a flow tube through which the subject stream to be measured is axially directed, said tube having input means to inject an air stream into said tube to create a radial air pattern therein which is transversely directed relative to the subject stream, and a collector port positioned to normally capture said radial air stream,
    b. means to apply regulated air power to said input means to produce said radial air pattern which is normally captured by said collector port, said radial air pattern being deflected by said subject stream away from said collector port to a degree depending on the flow rate of the subject stream,
    c. a flow transducer coupled to said collector port for converting the flow derived from the collector port into corresponding signals indicative of the flow rate of the subject stream, and
    d. an indicator coupled to said transducer to indicate said signals.

2. A meter as set forth in claim 1, wherein said tube is provided with a disposable mouthpiece for testing the lungs of a human patient.

3. A meter as set forth in claim 1, wherein said air power is produced by a blower whose output is governed by a pressure-regulating valve.

4. A meter as set forth in claim 1, wherein said input means is constituted by two jet ports coupled to opposing nozzles to produce said radial jet pattern across said tube.

* * * * *